US008525836B1

(12) United States Patent
Poursohi et al.

(10) Patent No.: US 8,525,836 B1
(45) Date of Patent: Sep. 3, 2013

(54) SYSTEMS AND METHODS FOR REPRESENTING INFORMATION ASSOCIATED WITH OBJECTS IN AN AREA

(71) Applicants: Arshan Poursohi, Berkeley, CA (US); Ryan Hickman, Mountain View, CA (US)

(72) Inventors: Arshan Poursohi, Berkeley, CA (US); Ryan Hickman, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/644,271

(22) Filed: Oct. 4, 2012

Related U.S. Application Data

(60) Provisional application No. 61/595,869, filed on Feb. 7, 2012.

(51) Int. Cl.
*G06T 17/00* (2006.01)

(52) U.S. Cl.
USPC ........... 345/428; 345/581; 345/611; 345/660; 901/1; 901/46

(58) Field of Classification Search
USPC ................... 345/473; 382/232; 375/240.25; 707/797; 348/149; 700/245
See application file for complete search history.

(56) References Cited

U.S. PATENT DOCUMENTS

| | | | |
|---|---|---|---|
| 6,917,855 B2 * | 7/2005 | Gonzalez-Banos et al. | 700/245 |
| 6,924,805 B2 * | 8/2005 | Mech | 345/473 |
| 7,190,836 B2 | 3/2007 | Krishnan et al. | |
| 7,224,357 B2 | 5/2007 | Chen et al. | |
| 8,126,276 B2 * | 2/2012 | Bolle et al. | 382/232 |
| 2009/0060280 A1 * | 3/2009 | Choi et al. | 382/106 |
| 2009/0148034 A1 * | 6/2009 | Higaki et al. | 382/153 |
| 2009/0164638 A1 * | 6/2009 | Jang et al. | 709/226 |
| 2010/0040151 A1 * | 2/2010 | Garrett | 375/240.25 |
| 2012/0117124 A1 * | 5/2012 | Bruaset et al. | 707/797 |
| 2012/0148145 A1 * | 6/2012 | Liu et al. | 382/154 |
| 2012/0206602 A1 * | 8/2012 | Clucas et al. | 348/149 |
| 2012/0294534 A1 * | 11/2012 | Watanabe et al. | 382/195 |

OTHER PUBLICATIONS

Heckman et al., Potential negative obstacle detection by occlusion labeling, 2007. http://ieeexplore.ieee.org/xpl/freeabs_all.jsp?arnumber=4398970.
Hadsell et al., Online Learning for Offroad Robots: Using Spatial label Propagation to Learn Long-Range, 2007. http://www.cs.nyu.edu/~sumit/research/assets/lagrtr07.pdf.

* cited by examiner

*Primary Examiner* — Phi Hoang
(74) *Attorney, Agent, or Firm* — McDonnell Boehnen Hulbert & Berghoff LLP

(57) ABSTRACT

Methods and systems for representing information associated with an object in an area are provided. An example method includes determining a high-resolution representation of information associated with an area in which a robotic device is configured to operate. The high-resolution representation of information may include data associated with an object in the area and an indication of an occurrence of an update to the data. The method may further include determining a proximity of the robotic device to the object in the area. According to the method, when the proximity is less than a proximity threshold or the occurrence of the update is greater than an age threshold, a low-resolution representation of information associated with the area may be determined and provided to the robotic device.

20 Claims, 9 Drawing Sheets

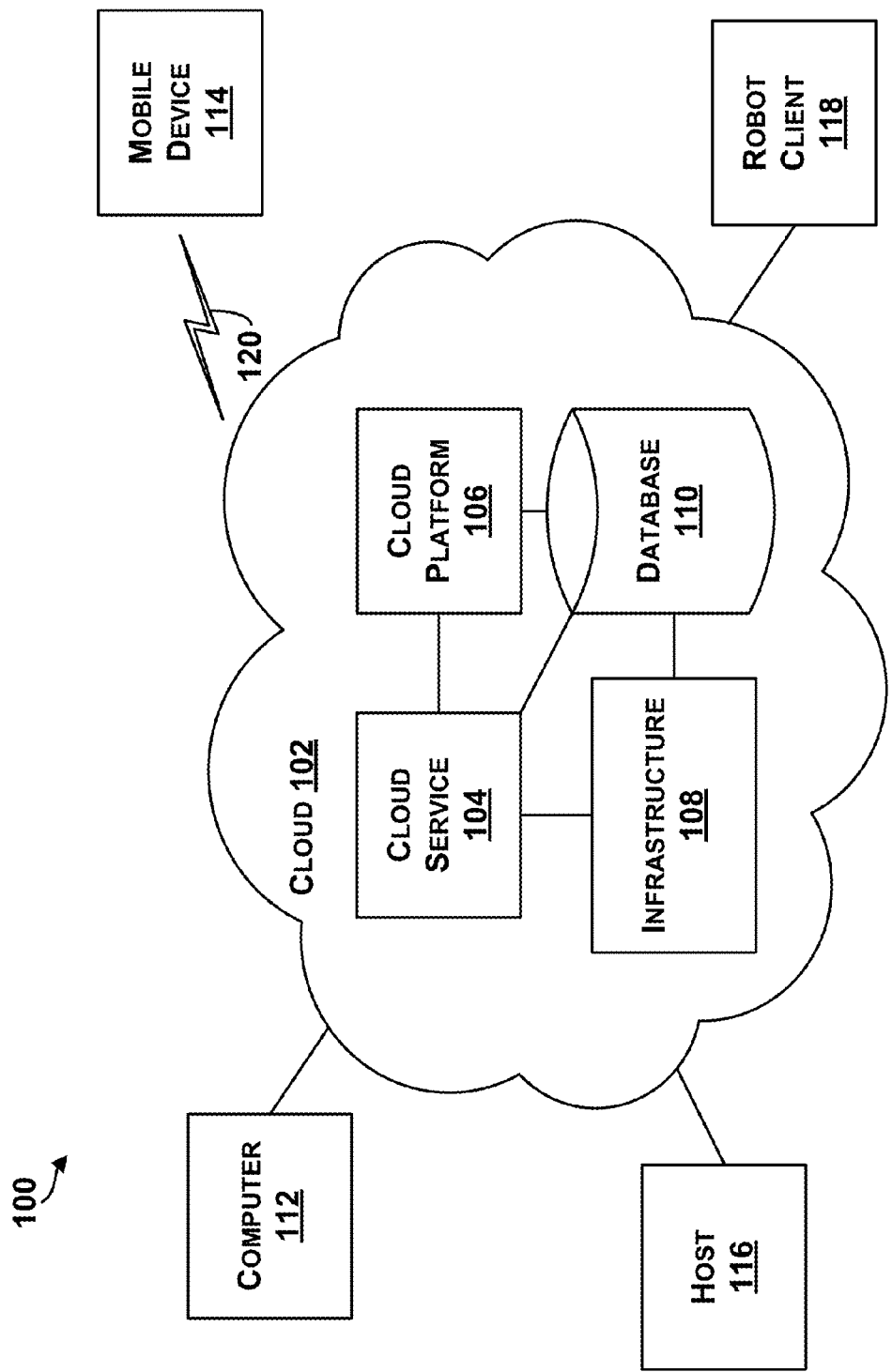

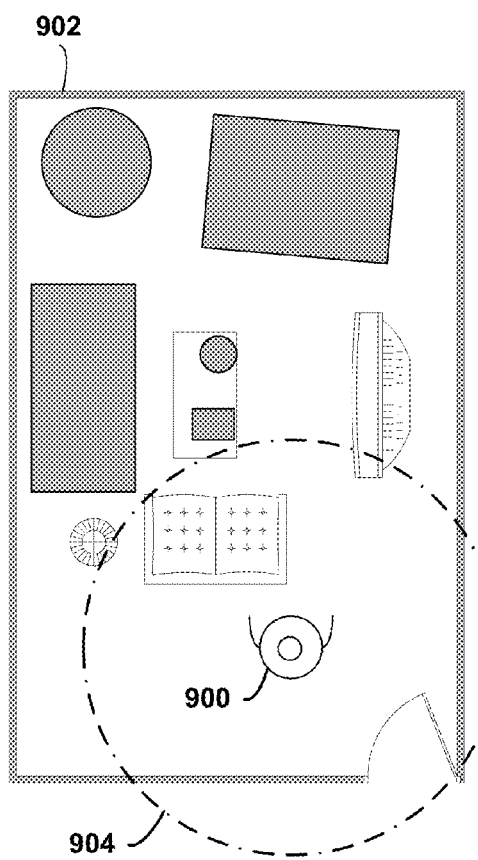
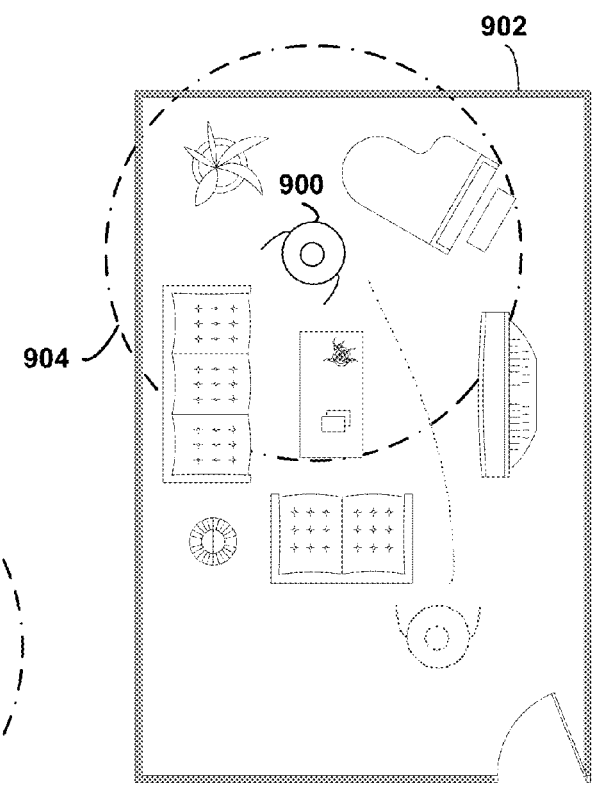
FIGURE 9A  FIGURE 9B

SYSTEMS AND METHODS FOR REPRESENTING INFORMATION ASSOCIATED WITH OBJECTS IN AN AREA

CROSS-REFERENCE TO RELATED APPLICATIONS

This application claims the benefit of U.S. Provisional Application No. 61/595,869 filed on Feb. 7, 2012, the entirety of which is herein incorporated by reference.

FIELD

This disclosure relates to robot cloud computing, and in examples, to representing information associated with objects in an area in a robot cloud interaction.

BACKGROUND

Cloud computing refers to provision of computational resources via a computer network. In a traditional model of computing, both data and software are fully contained on a user's computer. In cloud computing, however, the user's computer may contain relatively little software or data (perhaps a minimal operating system and web browser, for example), and may serve as a display terminal for processes occurring on a network of computers. A common shorthand provided for a cloud computing service (or even an aggregation of existing cloud services) is "the cloud".

Cloud computing has been referred to as "client-server computing", however, there may be distinctions between general cloud computing and client-server computing. For example, client-server computing may include a distributed application structure that partitions tasks or workloads between providers of a resource or service (e.g., servers), and service requesters (e.g., clients). Client-server computing generally involves a one-to-one relationship between the server and the client, whereas cloud computing includes generic services that can be accessed by generic clients (e.g., a one-to-one relationship or connection may not be required). Thus, cloud computing generally includes client-server computing, and additional services and functionality.

Cloud computing may free users from certain hardware and software installation and maintenance tasks through use of simpler hardware on the user's computer that accesses a vast network of computing resources (e.g., processors, hard drives, etc.). Sharing of resources may reduce cost to individuals. Thus, any computer connected to the cloud may be connected to the same pool of computing power, applications, and files. Users can store and access personal files such as music, pictures, videos, and bookmarks or play games or use productivity applications on a remote server rather than physically carrying around a storage medium, such as a DVD or thumb drive.

In one example, a computing device may interact with the cloud to receive information about an area. The computing device may download information associated with a computerized map of the area from the cloud. In one instance, the map may be a three-dimensional model of a room and include images of objects at locations in the room.

SUMMARY

This disclosure may disclose, inter alia, systems and methods for representing information associated with objects in an area.

In one example, a method is provided that comprises determining a high-resolution representation of information associated with an area in which a robotic device is configured to operate. The high-resolution representation of information may comprise data associated with an object in the area and an indication of an occurrence of an update to the data associated with the object in the area. The method may also include determining a proximity of the robotic to the objects in the area, and determining that the proximity is less than a proximity threshold or the occurrence of the update to the data is greater than an age threshold. According to the method, in response to determining that the proximity is less than the proximity threshold or the occurrence of the update to the data is greater than an age threshold, a low-resolution representation of information associated with the area may be determined and the low-resolution representation of information may be provided to the robotic device.

Any of the methods described herein may be provided in a form of instructions stored on a non-transitory, computer-readable medium, that when executed by a computing device, cause the computing device to perform functions of the method. Further examples may also include articles of manufacture including tangible computer-readable media that have computer-readable instructions encoded thereon, and the instructions may comprise instructions to perform functions of the methods described herein.

In another example, a computer-readable medium having stored thereon executable instructions that, when executed by a computing device, cause the computing device perform functions is provided. The functions may comprise determining a high-resolution representation of information associated with an area in which a robotic device is configured to operate. The high-resolution representation of information may comprise data associated with an object in the area and an indication of an occurrence of an update to the data associated with the object in the area. The functions also may comprise determining a proximity of the robotic device to the object in the area, and determining that the proximity is less than a proximity threshold or the occurrence of the update to the data is greater than an age threshold. The functions may further comprise, in response to determining that the proximity is less than the proximity threshold or the occurrence of the update to the data is greater than the age threshold: determining a low-resolution representation of information associated with the area and providing the low-resolution representation of information to the robotic device.

The computer-readable medium may include a non-transitory computer-readable medium, for example, such as computer-readable media that stores data for short periods of time like register memory, processor cache and Random Access Memory (RAM). The computer-readable media may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage medium.

In addition, circuitry may be provided that is wired to perform logical functions in any processes or methods described herein.

In still further examples, any type of devices may be used or configured to perform logical functions in any processes or methods described herein.

In another example, a system is provided that comprises a processor and memory including instructions stored therein executable by the processor to perform functions. The functions may comprise determining a high-resolution representation of information associated with an area in which a robotic device is configured to operate. The high-resolution representation of information may comprise data associated with an object in the area and an indication of an occurrence of an update to the data associated with the object in the area. The functions also may comprise determining a proximity of the robotic device to the object in the area, and determining that the proximity is less than a proximity threshold or the occurrence of the update to the data is greater than an age threshold. The functions may further comprise, in response to determining that the proximity is less than the proximity threshold or the occurrence of the update to the data is greater than the age threshold: determining a low-resolution representation of information associated with the area and providing the low-resolution representation of information to the robotic device.

In yet further examples, any type of devices may be used or configured as means for performing functions of any of the methods described herein (or any portions of the methods described herein).

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 1 is an example system for cloud-based computing.

FIGS. 9A-9B are example conceptual illustrations of a robotic device receiving information associated with objects in an area.

DETAILED DESCRIPTION

Figure 2A:
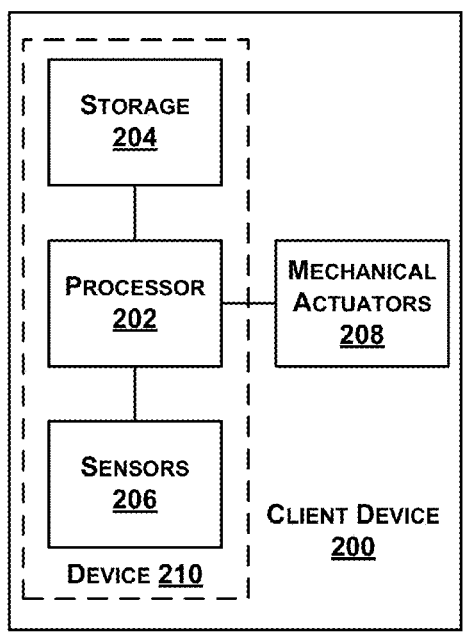
FIGS. 2A-2C are example illustrations of robotic devices.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for representing information associated with one or more objects in an area. An example method includes determining information associated with an area in which a robotic device resides, operates, or is configured to operate. The information may be a high-resolution representation of information, and may comprise data associated with objects in the area and an indication of an occurrence of an update to the data associated with the area and/or objects in the area. For instance, the occurrence of the update to the data may be described as an age of the data. In some examples, the data associated with the objects may include, but is not limited to, two-dimensional images, three-dimensional images, three-dimensional models, surface features of the object, information identifying the object (e.g., metadata such as a name or manufacturer), instructions for use, access controls, rules for access, etc. Thus, in some examples, the information may include any type of information associated with and/or stored with the object. Additionally the method may include determining a proximity of the robotic device to the objects in the area. For example, the proximity may be determined with respect to a proximity threshold and may change over time as the objects and/or the robotic device changes position.

According to the method, a determination may be made if the proximity is less than a proximity threshold or the occurrence of the update to the data is greater than an age threshold. When the proximity is less the proximity threshold or the occurrence of the update to the data is greater than the age threshold, an amount of the information associated with the area may be reduced based on a tree structure so as to create reduced information. For instance, a low-resolution representation of information associated with the area and the object (s) may be determined. The reduced information may also be transmitted to the robotic device.

For example, a parent dataset (or more than one parent dataset) may be a substitute for a child dataset (or more than one child dataset) of an individual object in the area. According to the tree structure, the datasets associated with the individual objects may represent child nodes of a data structure, beneath a parent node dataset. In one example, when information associated with a set of objects (e.g., a high-resolution representation of information) is reduced, rather than representing each of the individual objects individually, the set of objects may be represented by the parent node(s) of each of the objects. In some examples, the child datasets of the individual objects may be of a first size, and the parent dataset may be of a second size that is less than the first size. For example, a child dataset may include a number of types of information associated with the object, and the parent dataset of the may include an amount of information that is less than an amount included in the child dataset. In some instances, a parent dataset may be the same as a child dataset save for a portion of the child dataset that has been removed. In another instance, information within a parent dataset may be of a lower or reduced size than information within a child dataset (e.g., a child dataset may include a high resolution image of an object, and a corresponding parent dataset may include a lower resolution image of the object. Thus, a low-resolution representation of information may be provided instead of a high-resolution representation of information when the area is not of interest (e.g., far away) or data for an area is stale (e.g., has an age greater than an age threshold).

In some examples, transmitting a reduced amount of information associated with an area instead of a complete amount of information associated with objects in an area may improve networking speeds and/or processing of data associated with functions involving a mapping of objects in an area. For example, a robotic device may determine a navigation path within the area, interact with an object, make a decision, etc. based on the transmitted information. With a reduced amount of information to download and/or process, the robotic device may be able to perform a task more quickly as compared to a speed associated with performance of the task when downloading and/or processing a larger source of information.

Referring now to the figures, FIG. 1 is an example system 100 for cloud-based computing. Cloud-based computing generally refers to networked computer architectures in which application execution and storage may be divided, to some extent, between client and server devices. A "cloud" may refer to a service or a group of services accessible over a network (e.g., Internet) by client and server devices, for example.

In one example, any computer connected to the cloud may be connected to the same pool of computing power, applications, and files. Thus, cloud computing enables a shared pool of configurable computing resources (e.g., networks, servers, storage, applications, and services) that can be provisioned and released with minimal management effort or service provider interaction. Users can store and access personal files such as music, pictures, videos, and bookmarks or play games or use productivity applications on a remote server rather than physically carrying around a storage medium.

As an example, in contrast to a predominately client-based or server-based application, a cloud-based application may store copies of data and/or executable program logic at remote server devices, while allowing client devices to download at least some of this data and program logic as needed for execution at the client devices. In some examples, downloaded data and program logic can be tailored to capabilities of specific client devices (e.g., a personal computer, tablet, or mobile phone, or robot) accessing the cloud based application. In addition, dividing application execution and storage between the client and server devices allows more processing to be performed by the server devices taking advantage of server devices processing power and capability, for example.

Cloud-based computing can also refer to distributed computing architectures in which data and program logic for a cloud-based application are shared between one or more client devices and/or server devices on a near real-time basis. Parts of this data and program logic may be dynamically delivered, as needed or otherwise, to various clients accessing the cloud-based application. Details of the architecture may be transparent to users of client devices. Thus, a PC user or robot client device accessing a cloud-based application may not be aware that the PC or robot downloads program logic and/or data from the server devices, or that the PC or robot offloads processing or storage functions to the server devices, for example.

In FIG. 1, a cloud 102 includes a cloud service 104, a cloud platform 106, a cloud infrastructure 108, and a database 110. The cloud 102 may include more or fewer components, and each of the cloud service 104, the cloud platform 106, the cloud infrastructure 108, and the database 110 may comprise multiple elements as well. Thus, one or more of the described functions of the system 100 may be divided up into additional functional or physical components, or combined into fewer functional or physical components. In some further examples, additional functional and/or physical components may be added to the examples illustrated by FIG. 1. Delivery of cloud computing may involve multiple cloud components communicating with each other over application programming interfaces, such as web services and three-tier architectures, for example.

The cloud 102 may represent a networked computer architecture, and in one example, the cloud service 104 represents a queue for handling requests from client devices. The cloud platform 106 may include a frontend of the cloud and may be coupled to the cloud service 104 to perform functions to interact with client devices. The cloud platform 106 may include applications used to access the cloud 102 via a user interface, such as a web browser. The cloud infrastructure 108 may include service application of billing components of the cloud 102, and thus, may interact with the cloud service 104. The database 110 may represent storage capabilities by the cloud 102, and thus, may be accessed by any of the cloud service 104, the cloud platform 106, and/or the cloud infrastructure 108.

The system 100 includes a number of client devices coupled to or configured to be capable of communicating with components of the cloud 102. For example, a computer 112, a mobile device 114, a host 116, and a robot client 118 are shown coupled to the cloud 102. Of course, more or fewer client devices may be coupled to the cloud 102. In addition, different types of client devices may be coupled to the cloud 102. For example, any of the client devices may generally comprise a display system, memory, and a processor.

The computer 112 may be any type of computing device (e.g., PC, laptop computer, etc.), and the mobile device 114 may be any type of mobile computing device (e.g., laptop, mobile telephone, cellular telephone, etc.).

The host 116 may be any type of computing device or transmitter including a laptop computer, a mobile telephone, etc., that is configured to transmit data to the cloud 102.

The robot client 118 may comprise any computing device that has connection abilities to the cloud 102 and that has an actuation capability (e.g., electromechanical capabilities). A robot may further be a combination of computing devices. In some examples, the robot 118 may collect data and upload the data to the cloud 102. The cloud 102 may be configured to perform calculations or analysis on the data and return processed data to the robot client 118. In some examples, as shown in FIG. 1, the cloud 102 may include a computer that is not co-located with the robot client 118. In other examples, the robot client 118 may send data to a second client (e.g., computer 112) for processing.

Any of the client devices may include additional components. For example, the robot client 118 may include one or more sensors, such as a gyroscope or an accelerometer to measure movement of the robot client 118. Other sensors may further include any of Global Positioning System (GPS) receivers, infrared sensors, optical sensors, biosensors, Radio Frequency identification (RFID) systems, wireless sensors, and/or compasses, among others, for example.

In addition, any of the client devices may include an integrated user-interface (UI) that allows a user to interact with the device. For example, the robot client 118 may include various buttons and/or a touchscreen interface that allow a user to provide input. As another example, the robot client device 118 may include a microphone configured to receive voice commands from a user. Furthermore, the robot client 118 may include one or more interfaces that allow various types of user-interface devices to be connected to the robot client 118.

In FIG. 1, communication links between client devices and the cloud 102 may include wired connections, such as a serial or parallel bus. Communication links may also be wireless links, such as link 120, which may include Bluetooth, IEEE 802.11 (IEEE 802.11 may refer to IEEE 802.11-2007, IEEE 802.11n-2009, or any other IEEE 802.11 revision), or other wireless based communication links.

In other examples, the system 100 may include access points through which the client devices may communicate with the cloud 102. Access points may take various forms, for example, an access point may take the form of a wireless access point (WAP) or wireless router. As another example, if a client device connects using a cellular air-interface protocol, such as a CDMA or GSM protocol, an access point may be a base station in a cellular network that provides Internet connectivity via the cellular network.

As such, the client devices may include a wired or wireless network interface through which the client devices can connect to the cloud 102 (or access points). As an example, the client devices may be configured use one or more protocols such as 802.11, 802.16 (WiMAX), LTE, GSM, GPRS, CDMA, EV-DO, and/or HSPDA, among others. Furthermore, the client devices may be configured use multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

Figure 2B:
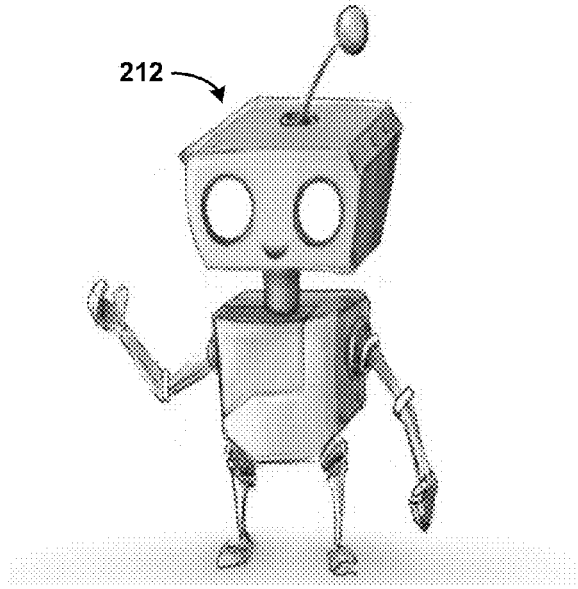
Figure 2C:
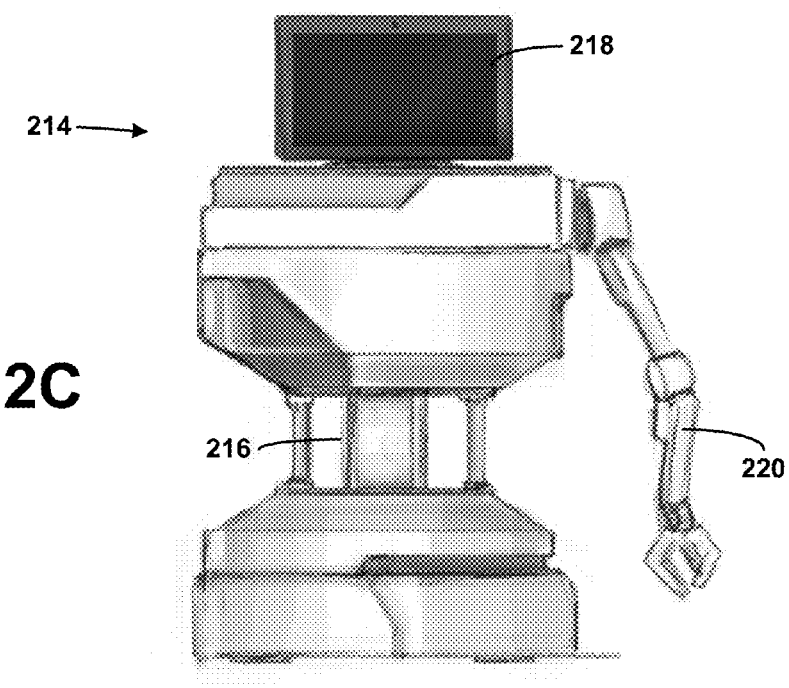

FIGS. 2A-2C are example illustrations of robotic devices. Any of the robots illustrated in FIGS. 2A-2C may be configured to operate according to example methods described herein, or according to instructions received from devices that may be configured to operate according to example methods described herein.

An example illustration of a robotic device 200 is shown in FIG. 2A. In one example, the robotic device 200 is configured as a robot. In some examples, a robot may contain computer hardware, such as a processor 202, memory or data storage 204, and one or more sensors 206. For example, a robot controller (e.g., processor 202, computing system, and sensors 206) may all be custom designed for a specific robot. The robot may have a link to access cloud servers (as shown in FIG. 1). A wired link may include, for example, a parallel bus or a serial bus such as a Universal Serial Bus (USB). A wireless link may include, for example, Bluetooth, IEEE 802.11, Cellular (such as GSM, CDMA, UMTS, EV-DO, WiMAX, or LTE), or Zigbee, among other possibilities.

In one example, the storage 204 may be used for compiling data from various sensors 206 of the robotic device 200 and storing program instructions. The processor 202 may be coupled to the storage 204 and may be configured to control the robotic device 200 based on the program instructions. The processor 202 may also be able to interpret data from the various sensors 206 on the robot. Example sensors may include a camera, smoke sensors, light sensors, radio sensors, infrared sensors, microphones, speakers, gyroscope, accelerometer, distance sensors, a camera, radar, capacitive sensors and touch sensors, etc. Example distance sensors include infrared ranging sensors, photoelectric distance sensors, proximity sensors, ultrasonic sensors, radar, or other types of sensors that may provide outputs used to determine a distance of the robotic device 200 to an object.

The robotic device 200 may also have components or devices that allow the robotic device 200 to interact with an environment of the robotic device 200. For example, the robotic device 200 may have a camera to provide images of a field of view of the environment as well as mechanical actuators 208, such as motors, wheels, movable arms, etc., that enable the robotic device 200 to move or interact with the environment.

In some examples, various sensors and devices on the robotic device 200 may be modules. Different modules may be added or removed from the robotic device 200 depending on requirements. For example, in a low power situation, a robot may have fewer modules to reduce power usages. However, additional sensors may be added as needed. To increase an amount of data a robot may be able to collect, additional sensors may be added, for example.

In some examples, the robotic device 200 may be configured to receive a device, such as device 210, that includes the processor 202, the storage 204, and the sensors 206. For example, the robotic device 200 may be a robot that has a number of mechanical actuators (e.g., a movable base), and the robot may be configured to receive a mobile telephone to function as the "brains" or control components of the robot. The device 210 may be considered a module of the robot. The device 210 may be physically attached to the robot or in communication with the robot. For example, a mobile phone may sit on a robot's "chest" and form an interactive display. The device 210 may provide a robot with sensors, a wireless link, and processing capabilities, for example. The device 210 may allow a user to download new routines for his or her robot from the cloud. For example, a laundry folding routine may be stored on the cloud, and a user may be able to select this routine using a mobile phone to download the routine from the cloud. When the mobile phone is placed into or coupled to the robot, the robot would be able to perform the downloaded action.

In some examples, the robotic device 200 may be coupled to a mobile or cellular telephone to provide additional sensing capabilities. The cellular phone may not be physically attached to the robot, but may be coupled to the robot wirelessly. For example, a low cost robot may omit a direct connection to the Internet. This robot may be able to connect to a user's cellular phone via a wireless technology (e.g., Bluetooth) to be able to access the Internet. The robot may be able to access various sensors and communication means of the cellular phone. The robot may not need as many sensors to be physically provided on the robot, however, the robot may be able to keep the same or similar functionality.

Thus, the robotic device 200 may include mechanical robot features, and may be configured to receive the device 210 (e.g., a mobile phone), which can provide additional peripheral components to the robotic device 200, such as any of an accelerometer, gyroscope, compass, GPS, camera, WiFi connection, a touch screen, etc., that are included within the device 210.

FIG. 2B illustrates a graphical example of a robot 212. In FIG. 2B, the robot 212 is shown as a mechanical form of a person including arms, legs, and a head. The robot 212 may be configured to receive any number of modules or components, such a mobile phone, which may be configured to operate the robot. In this example, a device (e.g., robot 212) can be attached to a mobile phone (e.g., device 210) to provide the mechanical robot 212 with functionality enabling the robot 212 to communicate with the cloud to cause operation/functions of the robot 212. Other types of devices that have connectivity to the Internet can be coupled to robot 212 to provide additional functions on the robot 212. Thus, the device 210 may be separate from the robot 212 and can be attached or coupled to the robot 212.

In one example, the robot 212 may be a toy with only limited mechanical functionality, and by connecting the device 210 to the robot 212, the toy robot 212 may now be capable of performing a number of functions with the aid of the device 210 and/or the cloud. In this manner, the robot 212 (or components of a robot) can be attached to a mobile phone to transform the mobile phone into a robot (e.g., with legs/arms) that is connected to a server to cause operation/functions of the robot.

FIG. 2C illustrates another example of a robot 214. The robot 214 includes a computing device 216, sensors 218, and a mechanical actuator 220. In this example, the computing device 216 may be a laptop computer, which may be coupled to the sensors 218. The sensors 218 may include a camera, infrared projectors, and other motion sensing or vision sensing elements. The sensors 218 may be included within a tablet device, which may also function as the computing device 216. The mechanical actuator 220 may include a base, wheels, and a motor upon which the computing device 216 and the sensors 218 can be positioned, for example.

Any of the robots illustrated in FIGS. 2A-2C may be configured to operate according to a robot operating system (e.g., an operating system designed for specific functions of the robot). A robot operating system may provide libraries and tools (e.g., hardware abstraction, device drivers, visualizers, message-passing, package management, etc.) to enable robot applications. Examples of robot operating systems include open source software such as ROS (robot operating system), DROS, or ARCOS (advanced robotics control operating system); proprietary software such as the robotic development platform ESRP from Evolution Robotics® and MRDS (Microsoft® Robotics Developer Studio), and other examples also include ROSJAVA. A robot operating system may include publish and subscribe functionality, and may also include functionality to control components of the robot, such as head tracking, base movement (e.g., velocity control, navigation framework), etc.

Figure 3:
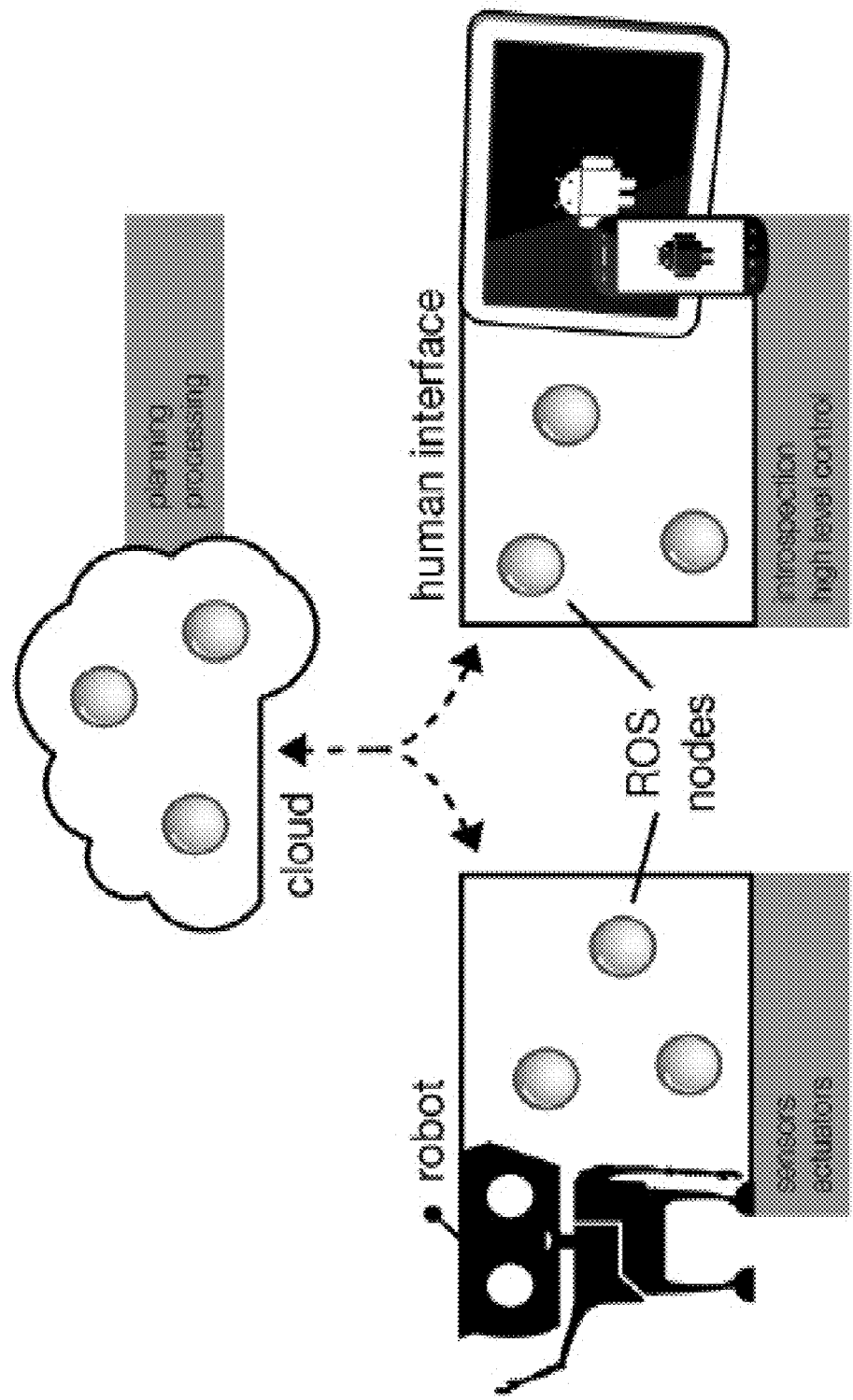
FIG. 3 illustrates an example of a conceptual robot-cloud interaction.

FIG. 3 illustrates an example of a conceptual robot-cloud interaction. A robot, such as a robot described and illustrated in FIG. 2, may connect to a network of computers (e.g., the cloud), and may request data or processing to be performed by the cloud. In one example, the robot may include a number of sensors and mechanical actuators that may generally provide motor control for the robot. Outputs of the sensors, such as camera feeds, vision sensors, etc., may be provided to the cloud, which can process the outputs to enable the robot to perform functions. The cloud may process a camera feed, for example, to determine a location of a robot, perform object recognition, or to indicate a navigation pathway for the robot.

FIG. 3 generally illustrates motor controllers in which each module may conceptually represent a computer or node on the cloud that performs processing using motor controller inputs or data from the robot. FIG. 3 also generally illustrates sensors in which each module may conceptually represent a computer or node on the cloud that performs processing using sensor inputs or data from the robot. FIG. 3 further generally illustrates applications in which each module may conceptually represent a computer or node on the cloud that performs specific functions of a number of applications, e.g., navigation application, mapping application, etc. In addition, FIG. 3 further generally illustrates planning in which each module may conceptually represent a computer or node on the cloud that performs processing for the robot, such as general planning or computing processing.

As shown, any of the modules may be interconnected, and/or may communicate to receive data or instructions from each other so as to provide a specific output or functionality for the robot.

In one example, the robot may send data to a cloud for data processing, and in another example, the robot may receive data from the cloud. The data received from the cloud may be in many different forms. The received data may be a processed form of data the robot sent to the cloud. The received data may also come from sources other than the robot. For example, the cloud may have access to other sensors, other robots, and the Internet.

Figure 4:
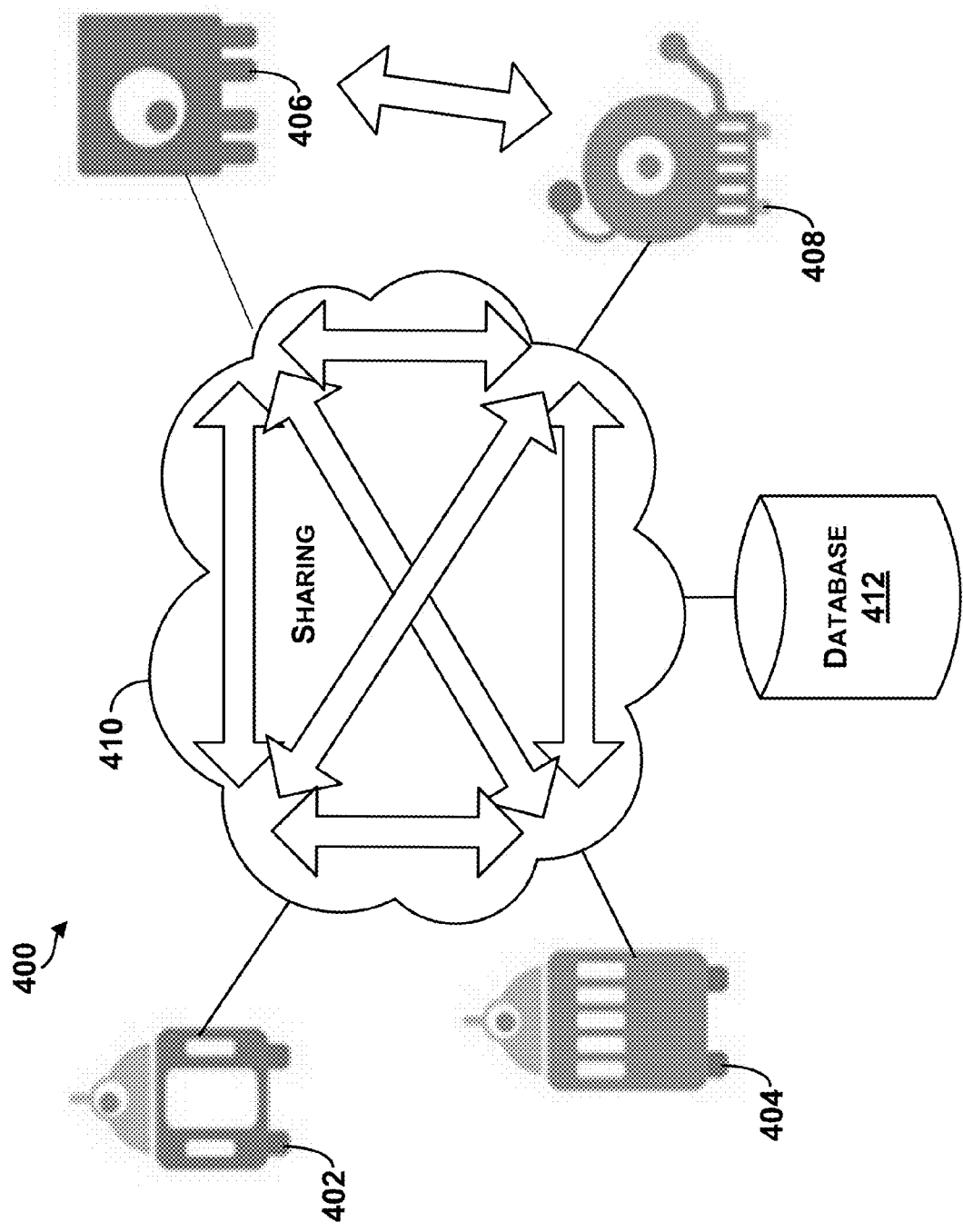
FIG. 4 is an example system in which robotic devices may interact with the cloud and share information with other cloud computing devices.

FIG. 4 is an example system 400 in which robots may interact with the cloud and share information with other cloud computing devices. The system 400 illustrates robots 402, 404, 406, and 408 (e.g., as conceptual graphical representations) each coupled to a cloud 410. Each robot 402, 404, 406, and 408 may interact with the cloud 410, and may further interact with each other through the cloud 410, or through other access points and possibly directly (e.g., as shown between robots 406 and 408).

The cloud 410 may receive input from several robots. Data from each robot may be complied into a larger data set. For example, the robot 402 may take a picture of an object and upload the picture to the cloud 410. An object recognition program in the cloud 410 may be configured to identify the object in the picture and provide data to all the robots connected to the cloud 410 about the recognized object, as well as possibly about other characteristics (e.g., metadata) of the recognized object, such as a location, size, weight, color, etc. Thus, every robot may be able to know attributes of an object in a photo uploaded by the robot 402.

The robots 402, 404, 406 and 408 may perform any number of actions with an area, people, other robots, etc. In one example, each robot 402, 404, 406 and 408 has WiFi or other network based connectivity and will upload/publish data to the cloud 410 that can then be shared with any other robot. In this manner, each robot 402, 404, 406 and 408 shares experiences with each other to enable learned behaviors. Each robot 402, 404, 406, and 408 will have access to real-time up to date data. Overall, the robots 402, 404, 406, and 408 may be configured to share data that is collected to enable faster adaptation, such that each robot 402, 404, 406, and 408 can build upon a learned experience of a previous robot.

The database 412 may be accessible by all robots through the cloud 410 (or alternatively directly accessible by all robots without communication through the cloud 410). The database 412 may thus be a shared knowledge base stored in the cloud 410. In some examples, robots may share learned behaviors through the cloud 410. The cloud 410 may have a server that stores robot learned activities or behaviors resulting in a shared knowledge base of behaviors and heuristics for object interactions (e.g., a robot "app store").

Thus, within examples, the robots 402, 404, 406, and 408 may share information through the cloud 410, and may access the database 412. The robots 402, 404, 406, and 408 may access the cloud 410 to perform any number of functions or methods described herein.

In some examples, robotic devices may access the cloud to send/receive information associated with objects in an area.

Figure 5:
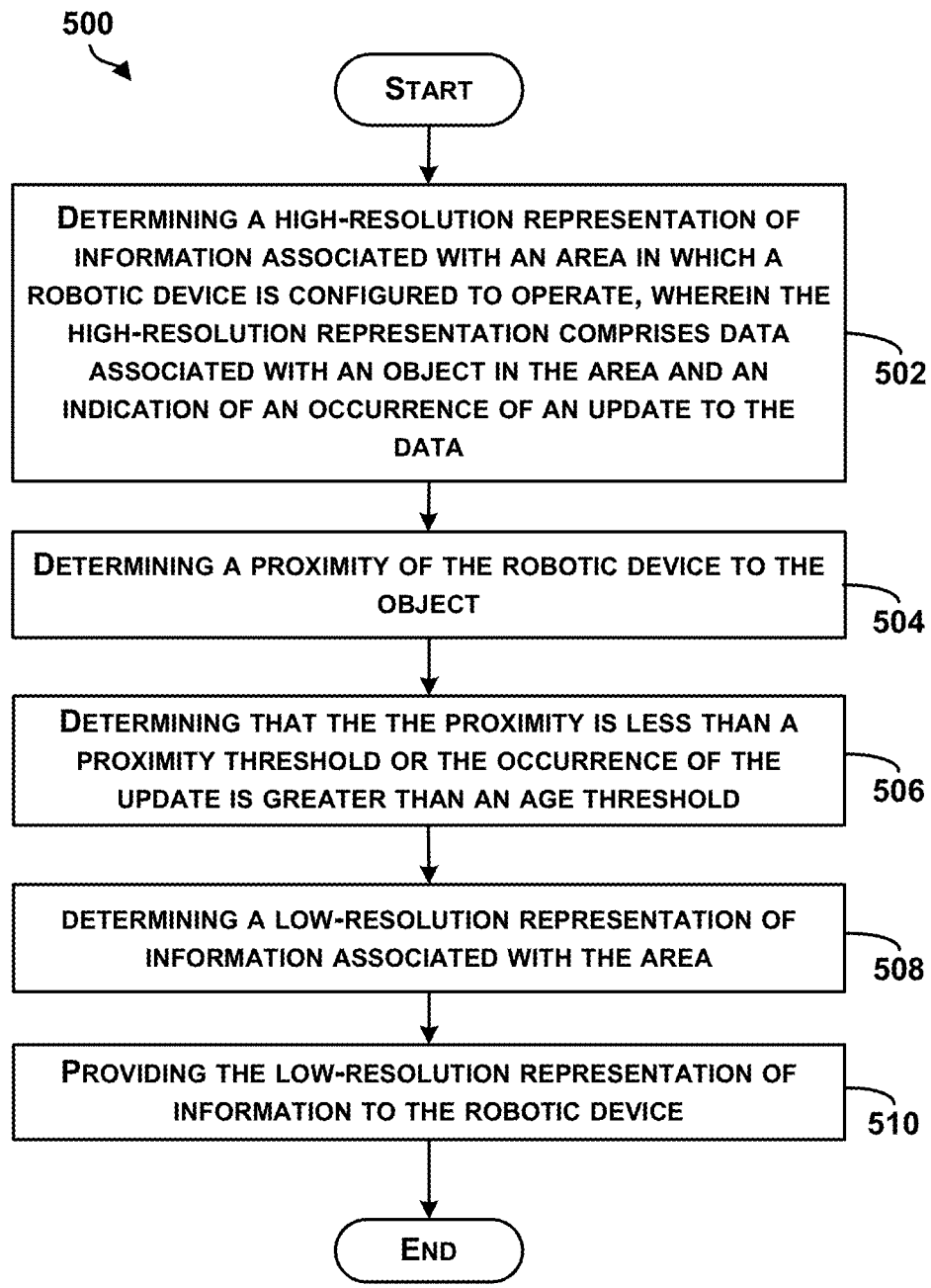
FIG. 5 is a block diagram of an example method of representing information associated with objects in an area.

FIG. 5 is a block diagram of an example method 500 of representing information associated with objects in an area. Method 500 shown in FIG. 5 presents an embodiment of a method that could be used with the system 100, for example, and may be performed by a device, such as any devices illustrated in FIGS. 1-2, or components of the devices. Method 500 may include one or more operations, functions, or actions as illustrated by one or more of blocks 502-510. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and Random Access Memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device.

In addition, for the method 500 and other processes and methods disclosed herein, each block in FIG. 5 may represent circuitry that is wired to perform the specific logical functions in the process.

At block 502, the method 500 includes determining a high-resolution representation of information associated with an area in which a robotic device is configured to operate. The high-resolution representation of information may comprise data associated with an object in the area and an indication of an occurrence of an update to the data associated with the object. In one example, the data associated with the object may include images of individual objects in the area. In some examples, one or more images may be three-dimensional images or models (e.g., a computer-aided design (CAD) drawing, or raw three-dimensional model such as a point cloud, etc.). For example, an image may be a three-dimensional image comprising a number of voxels. In other examples, an image may include information such as bump mapping, texture mapping, relief mapping, or specularity mapped to a three-dimensional model of an object. In another example, the data associated with the object may include metadata such as a name, manufacturer, instructions for use, access controls, rules for access, or any other type of information associated with the objects.

In one example, an age may be determined based on the occurrence of the update to the data associated with the object. For example, the age may be an elapsed time from a time when the data was stored or updated in a database, as indicated by the occurrence of the update, to a current time. In a further example, the data associated with the area may have been gathered by another robotic device and stored in the database.

At block 504, the method 500 includes determining a proximity of the robotic device to the object in the area. For example, a distance may be determined from the robotic device to one or more of objects in the area. In one instance, information associated with a location of the robotic device may be determined. Additionally, information associated with a location of the objects from information stored in a database may be determined. Based on the location of the robotic device and the location of the objects, the proximity may be determined.

At block 506, the method 500 includes determining that the proximity is less than a proximity threshold or the occurrence of the update to the data is greater than an age threshold. In some examples, the proximity may be compared to a predetermined threshold such as a circumference of a circle concentric with the location of the robotic device. However, the predetermined threshold may be any distance or proximity and can be set by a user. As an example, the proximity may be a circle of radius 10 meters, and any location farther than 10 meters away from the robotic device in any direction may be determined to be less than the proximity threshold. In some examples, the occurrence of the update to the data may be compared to an age threshold, such as three days, for example. In an instance in which the age threshold is one day, if the occurrence of the update to the data indicates the data is from greater than one day ago, the age may be determined to be greater than the age threshold.

When the proximity is less than a proximity threshold or the occurrence of the update to the data is greater than an age threshold, the method 500 may include, at block 508, determining a low-resolution representation of information associated with the area. For example, a robotic device may have received or determined data a few days ago when the robotic device (or another robotic device) was in a room. When the robotic device enters the room at a later time, the low-resolution representation of information may be determined because the data associated with the object is stale. In an instance where the information describes a mapping of objects in an area, the objects may be in a first position time when the mapping is determined. If the robotic device enters the area at a second time, later than the first time such that the information is old or dated (i.e., stale), the information may be reduced (e.g., the low-resolution representation of information may be determined as a substitute for the high-resolution representation of information). This may be beneficial, for example, in instances where locations of the objects in the area are not constant, but may vary with time.

In one example, the low-resolution representation of information may be determined based on a tree structure. For example, the tree structure may be a data structure that emulates a hierarchical tree structure with a set of linked nodes (i.e., a graphical form of representing a structure resembling an upside-down tree with a top "root" and multiple "leaves"). A node in the tree structure may contain zero or more child nodes below the node in the tree structure. A node that has a child may be called the child's parent node. A node also may have one parent. Nodes that do not have any children (child nodes) may be referred to as leaf nodes or terminal nodes.

In some examples, information associated with individual images of objects in the area may be reduced based on a tree structure. For example, a parent dataset (or more than one parent dataset) may be a substitute for a child dataset (or more than one child data) of an individual object in the area. In one example, the child datasets may include information associated with individual objects in the area. In some examples, the parent datasets may include information associated with one or more objects in the area, and may correspond to one or more child datasets. According to the tree structure, the datasets associated with the objects may represent child nodes beneath a parent node dataset in the data structure. In one example, when a low-resolution representation of information is determined, rather than representing each of the individual objects individually, the set of objects may be represented by the parent dataset(s) of each of the objects. As an example of a further reduction of the amount of information, in an instance in which a parent dataset is a not a root node (i.e., the topmost node not having a parent in a data structure), an amount of reduction may be increased by representing multiple parent nodes, and all of their descendants, by a single root node. Thus, in some instances, the high-resolution representation of information may include a parent dataset associated with the object while the low-representation of information may include a child dataset associated with the object.

In some examples, the child datasets may include images of the individual objects that may be of a first resolution (e.g., a high resolution), and the parent dataset may include an image that may be an image of a second resolution (e.g., a low resolution) that is less than the first resolution. However, in other instances, the parent dataset may include an image that may be of a greater resolution than a child image or equal resolution as the image of the child dataset. For example, a reduction of information may occur by simply reducing a total number of images associated with objects in an area based on the tree structure.

In one example, a size of the low-resolution representation of information may be directly proportional to the proximity, such that as the proximity decreases, the size of the low-resolution representation of information decreases. In another example, a size of the low-resolution representation of information may be inversely proportional to the age, such that as the age increases, the size of the low-resolution representation of information decreases. In some instances, a difference between the proximity threshold and a proximity or a difference between the age threshold and an occurrence of an update may determine an amount of reduction of the information associated with an area. For example, in an instance in which an age threshold is one day, information associated with an area (e.g., data associated with an object in the area) that is three days old may be reduced by a greater amount than information associated with an area that is two days old. In an instance in which a proximity threshold is 20 feet, information associated with an object in the area that is 30 feet away may be reduced by a greater amount than information associated with an object that is 40 feet away. Thus, the amount of reduction of the information associated with the area and the size of the low-resolution representation of information may vary based on a relative relationship between a proximity and the proximity threshold or an occurrence of an update and the age threshold.

In one example, the amount of reduction may be varied by changing a resolution of the image of the parent dataset. In general, the term resolution may refer to an amount of detail an image holds or includes, and may be measured in a variety of ways. A greater or higher resolution may refer to more image detail. In one instance, resolution may describe a pixel density (or voxel density in three-dimensions) or number of pixels displayed with a specified space. For example, resolution may be tied to physical sizes (e.g., pixels per inch), or to overall size of an image (total number of pixels/voxels in an image). In another instance, resolution may describe an amount of information mapped to a three-dimensional model of an object.

In an example in which information associated with a location of the object is used to determine a proximity to the location of the object(s), the size of the low-resolution representation of information may be determined based on an age of the information associated with the location of the object (s). For example, a robotic device may have determined or received information associated with locations of objects in a room a few days ago. When the robotic device enters the room again, the information associated with locations of the objects may be stale, and the amount of reduction may be more than if the age of the information associated with locations was not as old. Thus, the size of the low-resolution representation of information may be inversely proportional to the age of the information associated with location of the objects, such that as the age increases, the size of the low-resolution representation of information decreases.

In another example, the size of the low-resolution representation of information may be based on a sensors or capabilities of the robotic device. For example, if the robotic device has a capability to receive or process three-dimensional information, the datasets may include three-dimensional information. In an instance in which the robotic device has a depth sensor, but does not have a color sensor, the datasets may include three-dimensional and gray scale information.

At block 510, the method 500 includes providing the low-resolution representation of information to the robotic device. The low-resolution representation of information may be transmitted to the robotic device according to a variety of ways. In an instance in which the method is performed by a server (e.g., a server in a cloud), the information may be transmitted via a connection between the robotic device and the cloud. For example, the server may perform any or all of blocks 502-510 of the method 500. In some examples, the server may receive information from the robotic device to facilitate determining the information associated with the area, and when the information associated with the area should be reduced.

In one instance, the method 500 may be performed by another robotic device possessing knowledge of the information associated with the area. The information may be transmitted to the robotic device from the another robotic device according to a variety of communication methods between the robotic devices. In another instance, the robotic device may request the information associated with the area, and the reduced information may be responsively transmitted to the robotic device.

According to the method 500, in one example, information associated with a field of view of the robotic device may be determined. Based on the information associated with the field of view, the low-resolution representation of information may be determined and provided to the robotic device when the objects in the area are not in the field of view of the robotic device. For example, if a robotic device is looking forward, information associated with objects in an area that are on either side of (or behind) the robotic device and outside of a peripheral viewing area of the robotic device may be reduced by displaying images representing multiple individual images, included within a parent dataset, of the objects that are on either side of the robotic device.

In addition, the method 500 may also include receiving information associated with a change in position of the robotic device. In one instance, the information associated with the change in position may indicate that the proximity of the robotic device to the objects in the area is increasing above the proximity threshold. As a result of the increase above the proximity threshold, in some examples, the high-resolution representation of information may be provided to the robotic device. For instance, child datasets associated with the object (s) in the area may be transmitted to the robotic device. Thus, as the robotic device gets closer to objects in the area, which may have been less than the proximity threshold at a previous instance in time, the robotic device may receive more information associated with the object(s).

In a further example, the method 500 may include determining which data associated with the object(s) the robotic device utilizes, and sending information indicating a level of importance of the data associated with the object(s) the robotic device utilizes to a server. For example, the level of importance may be a number on a scale of 1 to 10, where 10 is the most important and 1 is the least important. In one instance, the level of importance may be based on whether the robotic device utilizes an image of an object to interact with the object (e.g., to avoid the object, pick up the object, make a decision, etc.). In another instance, the level of importance may be based on whether the robotic device utilizes metadata to interact with the object.

In one example, the level of importance may be used to optimize a future reduction of the amount of information associated with the area. For example, another proximity of a second robotic device to the objects may be determined, and when the another proximity is less than the proximity threshold, the determination of the low-resolution representation of information may be optimized based on the information indicating the level of importance of the data associated with the objects the robotic device utilizes. In one instance, information associated with an object with a level of importance that is greater than 7 on a scale of 1 to 10 may not be reduced because of the information associated with the level of importance. In another example, the level of importance may be used to optimize a size of another dataset associated with the object sent to a second robotic device. For example, a resolution of another image included with a dataset sent to the second robotic device may be directly proportional to the level of importance of an object or data associated with the object.

The information, such as the low-resolution representation of information and/or the high-resolution representation of information, may be transmitted to the robotic device to facilitate the robotic device performing one or more of a variety of functions. In one example, the robotic device may determine a navigation path within the area based on the transmitted information. For example, to navigate a mobile robot inside a building to a distinct waypoint, a motion planning algorithm may produce speed and turning commands necessary to execute the navigation. In another example, the robotic device may use the information to perform obstacle avoidance.

In yet another example, the robotic device may interact with the object based on the transmitted information. For example, the robotic device may enter a kitchen to retrieve an item off of a counter. Initially, the robotic device may receive a first dataset including a crude/rough map of where the robotic device needs to go in the kitchen and where the item is and images of the kitchen and the item. In one instance, the item may be represented by a block or a cube within the map. As the robotic device approaches the counter, the robotic device may request or automatically receive another dataset including higher resolution images of the counter and the item over time. Based on the received higher resolution images, the robotic device may grasp the item.

In still another example, the robotic device may make a decision (e.g., a binary decision, a decision based on fuzzy logic, etc.) based on the transmitted information. For example, the robotic device may receive reduced information associated with two hallways and initially make a decision on which hallway to travel through. After the robotic device chooses a hallway, the robotic device may receive a dataset including higher resolution images of the chosen hallway, including, for example, images of objects in the hallway.

In one instance, multiple sizes of datasets including, for example, multiple levels of higher resolution data, may be available to the robotic device, such as centimeter-level resolution, meter-level resolution, etc. However, the robotic device may only need course meter-level resolution data because the robotic device is simply passing through the hallway versus interacting with an object in the hallway. Based on knowledge of an intent of the robotic device, the robotic device may receive an appropriate amount of information and data of an appropriate resolution, such as the meter-level resolution data for passing through the hallway.

Figure 6:
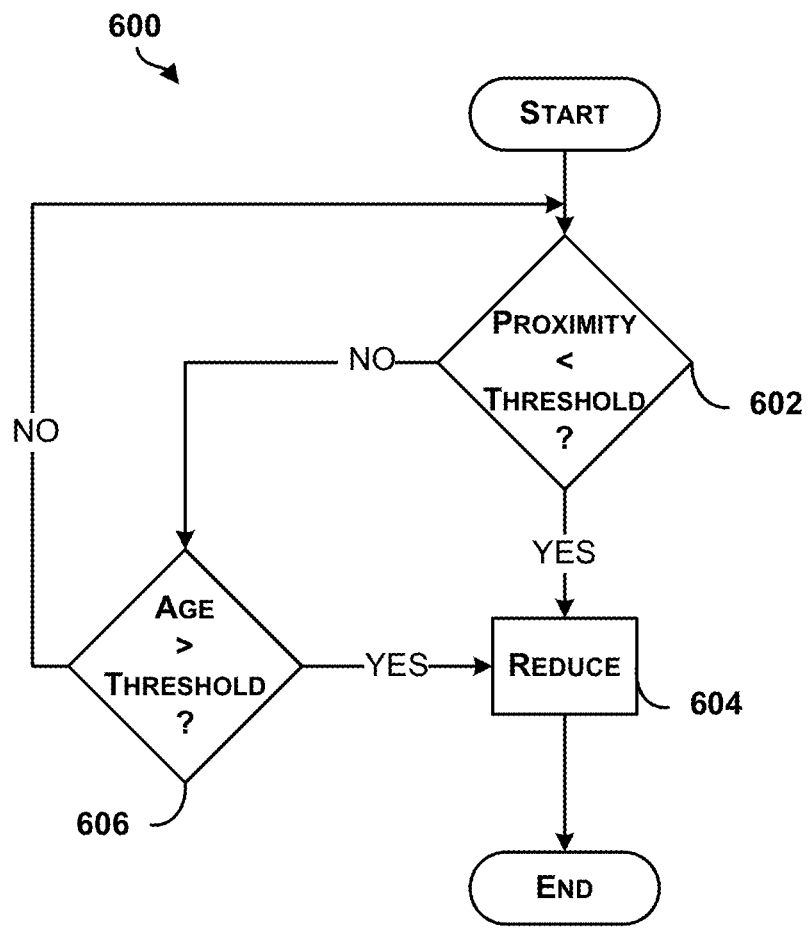
FIG. 6 is a flow diagram illustrating an example method of when to reduce an amount of information associated with an area.

FIG. 6 is a flow diagram 600 illustrating an example method of when to reduce an amount of information associated with an area. The flow diagram 600 illustrates the flow of one example process for determining whether the amount of information associated with the area should be reduced based on a proximity and an age. As shown in FIG. 6, at block 602, a decision may be made based on whether the proximity is less than a proximity threshold. If the proximity is determined to be less than the proximity threshold, the amount of information associated with the area may be reduced at block 604.

If the proximity threshold is determined not to be less than the proximity threshold, at block 606, an additional decision may be made whether the age of the information associated with the area (as indicated by an occurrence of an update to data associated with an object, e.g.) is greater than an age threshold. If the age is determined to be greater than the age threshold, the amount of information associated with the area may be reduced at block 604. In some examples, if the age is determined not to be greater than the age threshold, at a later instance in time, the process may be restarted at block 602. In other examples, the process may terminate if the age is determined not to be greater than the age threshold.

In another example, the decision blocks 602 and 606 may swap positions, such that a comparison between the age and the age threshold occurs prior to a comparison between the proximity and the proximity threshold (not shown). In yet another example, the comparisons may occur simultaneously or (substantially within the same time of each other), and the decision to reduce may be determined by analyzing the results of the two comparisons jointly (also not shown). For example, a lookup table having inputs comprising the resulting states of each of the two comparisons may be used to determine when to reduce the amount of information associated with the area.

Figure 7A:
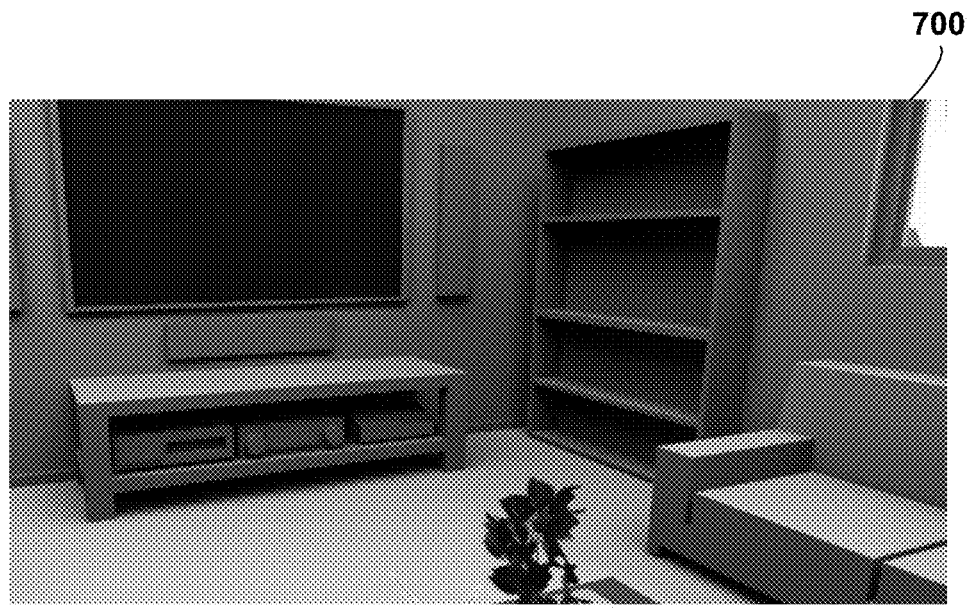
FIGS. 7A-7B are example conceptual illustrations of reducing information associated with objects in an area based on a tree structure.
Figure 7B:
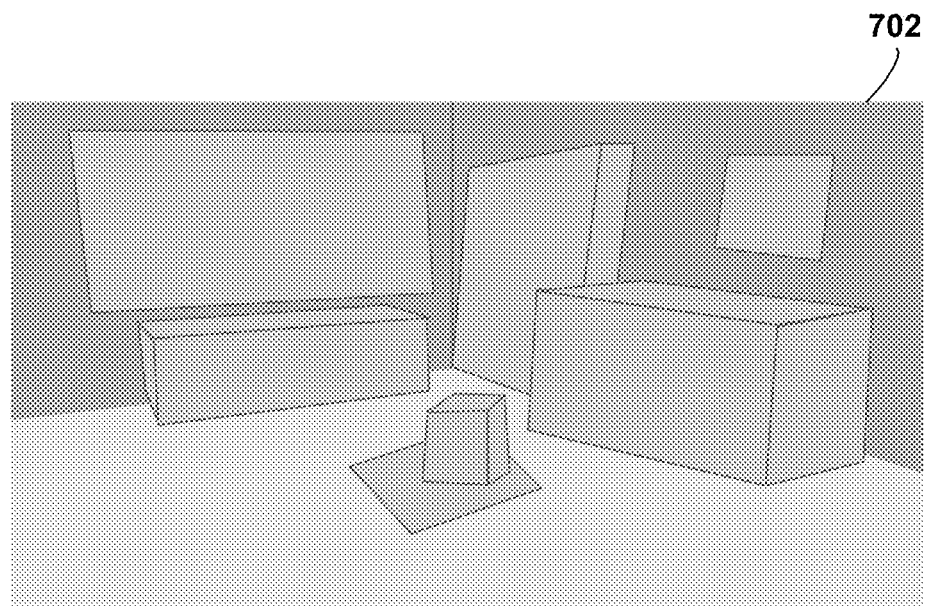

FIGS. 7A-7B are example conceptual illustrations of reducing information associated with an area based on a tree structure. As shown in FIG. 7A, a canonical representation 700 of a room may include images of various objects in the room, such as three-dimensional models of a television, bookshelf, couch, etc. In some examples, the canonical representation may include information indicating an age the information associated with each of the objects and information indicating a location within the room associated with each of the objects.

In some examples (e.g., when a proximity of a robotic device to a location of the objects is less than a proximity threshold or an age of the information associated with the room is greater than an age threshold), an amount of the information associated with the room may be reduced based on a tree structure. For example, a reduction of the information associated with the canonical representation 700 of the room may result in a reduced representation 702 as shown in FIG. 7B. In FIG. 7B, within the reduced representation 702, the various objects in the room (i.e., the television, bookshelf, couch, etc. as seen in FIG. 7A), have been reduced to two-dimensional and three-dimensional shapes, such as blocks, cubes, rectangles, etc. The shapes are of a lower resolution (i.e., include less information) than models of the objects as shown in FIG. 7A.

Additionally, some of the objects individually discernible in the canonical representation 700 are no longer discernible individually within the reduced representation 702. For example, three electronic devices on a shelf of the television stand, depicted in the canonical representation 700, have been reduced to being represented by a parent image, a rectangular cube below the television, in the reduced representation 702. In an instance in which the reduced representation 702 has been transmitted to a robotic device, as the robotic device approaches the television stand, the robotic device may receive images of the three electronic devices and the television stand. As another example, the television and three speakers surrounding the television (i.e., left speaker, right speaker, and bottom speaker), discernible in the canonical representation 700, are represented by a single parent image (i.e., the flat rectangle on the wall) in the reduced representation 702.

In another example, the canonical representation 700 may include information identifying the objects or other metadata displayed near the objects (not shown). In some examples, the information identifying the objects or other metadata may be removed within the reduced representation 702. In yet another example, the information identifying the objects or the metadata associated with the objects may be displayed in the reduced representation 702 for objects determined to be important (e.g., based on information indicating a level of importance as described above) (not shown).

Figure 8:
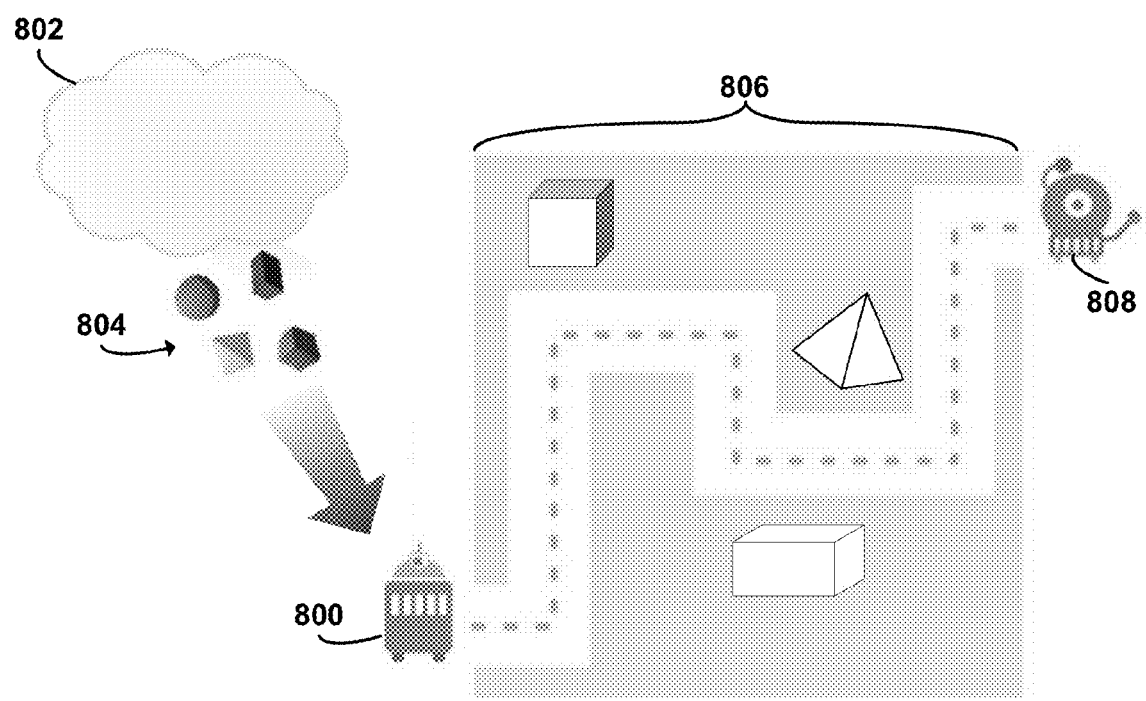
FIG. 8 is an example conceptual illustration of a robotic device interacting with a cloud to receive information associated with objects in an area.

FIG. 8 is an example conceptual illustration of a robotic device 800 interacting with a cloud 802 to receive information associated with objects 804 in an area 806. The robotic device 800 may interact with an object (such as any of objects 804), and interact with the cloud 802 to receive a dataset including an image of the object. For example, the robotic device 800 may capture one or more images of an object using any number of sensors, such as a camera (still pictures or video feeds), infrared projectors, etc. In some examples, the robotic device 800 may optionally capture information associated with characteristics about the object. In one instance, the robotic device 800 may determine or record a weight, dimensions, a texture, color, or any type of physical attribute of the object. A process in the cloud may identify the object and transmit an image of the object (e.g., an image of high resolution or low resolution) to the robotic device 800.

In other examples, the robotic device 800 may communicate with an object, such as by accessing memory of the object, to obtain additional data. For instance, if the object has communication capabilities, such as Wi-Fi, Bluetooth, infrared, or other wireless or wired methods, the robotic device 800 may communicate with the object to determine any type of data. Additionally, the object may have serial/parallel ports through which the robotic device may communicate with the object.

As an additional or alternative method for performing object recognition, objects may be tagged with a type of identifier (e.g., radio frequency identification (RFID) chip, near field communication chip (NFC), bar code, etc.), so that the robotic device 800 may include an application enabling the robotic device 800 to identify the object based on the identifier. The identifier may provide information about the object including an identification, details of the object (mass, color, type, brand, etc.), a location of the object, etc. In some examples, objects may emit beacons that can be received by robotic devices to determine existence/identification/location of the object. In this example, a physical environment may be instrumented with beacons in forms of NFC, RFID, QR codes, etc. to enable the robotic device 800 to localize and identify objects. Beacons may be stationary beacons or moving beacons (RFID in an employee's ID badge) to perform tracking of objects.

In one example, the datasets of the objects 804 may be downloaded from a database of objects in the cloud 802. In one instance, a canonical representation of an area 806 may be stored in a database, including locations of the objects 804 in the area 806. The robotic device 800 may download information associated with images of the objects 804 based on the canonical representation. In one example, based on an image of an object, the robotic device 800 may navigate through the area 806, avoid collisions with the object, make a decision based on the images of the object, pick up the object, etc.

In a further example, the robotic device may choose between information associated with the canonical representation of the area 806 and information gathered at different times by other robotic devices. For example, a second robotic device 808 may have previously traveled through the area 806, determined information associated with one or more objects in the area 806, and transmitted the information to the database. Based on a combination of the canonical representation of the area 806 and information from other robotic devices, the robotic device 800 may make an estimate of where the objects 804 in the area 806 are actually located. This may be beneficial, for example, in a room including moveable objects.

Information associated with the images of the objects 804 may be received by the robotic device 800 in some examples. For example, the robotic device 800 may receive data from the cloud 802 describing a two-dimensional and/or three-dimensional model of an object, data indicating an identity of an object in the image, or other information related to or associated with characteristics about an object. In some examples, the cloud 802 may perform object recognition on an uploaded image or video. For example, if a picture was taken in a living room, the cloud 802 may be able to identify a television and provide a three-dimensional model of the television.

FIGS. 9A-9B are example conceptual illustrations of a robotic device 900 receiving information associated with objects in an area 902. In one example, the robotic device 900 may receive images of objects in the area 902 with varying resolutions. For example, based on a proximity of the robotic device 900 to the objects in the area 902, the robotic device 900 may receive high or low resolution images. In one instance, the low resolution images may be images that are reduced based on a tree structure. A predetermined proximity threshold is conceptually illustrated by a circumference 904 of a circle concentric with a location of the robotic device 900.

As shown in FIG. 9A, the robotic device 900 receives images of objects within the circumference 904 that have a greater resolution than images not within the circumference 904. Based on the location of the robotic device 900, high resolution images of objects in the area 902, such as a love seat, television, coffee table, and a lamp, are received. In addition, low resolution images of other objects in the area 902 may be received, such as circles, squares, rectangles, etc. representing locations of objects farther away from the robotic device 900. Based on the received images, the robotic device may navigate through the area 902 to perform a task (e.g., to pick up an item of off the coffee table).

As shown in FIG. 9B, the robotic device 900 may receive additional high resolution images of objects in the area 902 as the position of the robotic device 900 changes. Based on the location of the robotic device 900, high resolution images of a piano, house plant, couch, and items on the coffee table may be received as a proximity of an object to the location of the robotic device 900 increases above the predetermined proximity threshold.

In one example, information associated with a speed of the robotic device 900 may also be determined, and the predetermined proximity threshold may vary based on the speed of the robotic device. For example, based on the speed of the robotic device 900, the predetermined proximity threshold may be increased or decreased. In one instance, while the robotic device 900 is traveling with a speed greater than a speed threshold, the predetermined proximity threshold may be increased to account for objects that the robotic device 900 may encounter earlier than if the robotic device 900 was traveling with a slower speed. In another instance, the speed and a direction of the robotic device 900 may be used to predict which objects the robotic device 900 may encounter, and the resolution of the predicted objects may be adjusted. For example, if a robotic device 900 is traveling with a given speed and orientation towards an object, the robotic device 900 may receive a high resolution image of the object that has a greater resolution while images of objects that the robotic device 900 is bypassing may be reduced based on a tree structure.

In some examples, objects closer to the robotic device 900 at a first instance in time, which are represented by high resolution images, may be adjusted or replaced such that the objects are represented by images of lower resolution at a later instance in time (not shown). For example, as a proximity to the objects decreases below the predetermined proximity threshold, the images of the objects may be reduced based on a tree structure because the robotic device or a server determines a full amount of information associated with the objects is no longer necessary.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   determining, by a computing device having a memory, a high-resolution representation of information associated with an area in which a robotic device is configured to operate, wherein the high-resolution representation of information comprises data associated with an object in the area and an indication of an occurrence of an update to the data associated with the object in the area;
   determining an age of the data associated with the object in the area, wherein the age is associated with an elapsed time from the occurrence of the update to a current time;
   determining that the age is greater than an age threshold; and
   in response to determining that the age is greater than the age threshold:
      determining, by the computing device, a low-resolution representation of information associated with the area; and
      providing the low-resolution representation of information to the robotic device, wherein a size of the low-resolution representation of information is inversely proportional to the age, such that as the age increases, the size of the low-resolution representation of information decreases.

2. The method of claim 1, wherein the low-resolution representation of information comprises a parent dataset associated with the object and the high-resolution representation of the information comprises a child dataset associated with the object, wherein the parent dataset is a substitute for the child dataset based on a tree structure.

3. The method of claim 2, wherein the child dataset comprises one or more of a two-dimensional image, a three-dimensional image, a three-dimensional model, surface features of the object, information identifying the object, instructions for use of the object, and rules for access.

4. The method of claim 2, wherein the child dataset comprises a first image of the object of a first resolution and the parent dataset comprises a second image of the object of a second resolution, wherein the first resolution is greater than the second resolution.

5. The method of claim 1, further comprising determining a proximity of the robotic device to the object in the area and
   wherein the size of the low-resolution representation of information is proportional to the proximity, such that as the proximity decreases, the size of the low-resolution representation of information decreases.

6. The method of claim 1, further comprising:
   receiving information associated with a change in position of the robotic device; and
   as the proximity increases above a proximity threshold, providing the high-resolution representation of information to the robotic device.

7. The method of claim 6, further comprising:
   determining information associated with a speed of the robotic device; and
   wherein the proximity threshold varies based on the speed of the robotic device.

8. The method of claim 6, further comprising:
   determining which data associated with the object the robotic device utilizes; and
   sending information indicating a level of importance of the data associated with the object the robotic device utilizes to a server.

9. The method of claim 8, further comprising:
   determining another proximity of a second robotic device to the object; and
   optimizing the low-resolution representation of information based on the information indicating the level of importance of the data associated with the object.

10. The method of claim 5, wherein determining the proximity of the robotic device to the object in the area comprises:
    determining information associated with a location of the robotic device;
    determining information associated with a location of the object from information stored in a database; and
    determining the proximity based on the information associated with the location of the robotic device and the information associated with the location of the object.

11. The method of claim 10, wherein the age is associated with an elapsed time from a time when the information associated with the location of the object was stored to a current time.

12. The method of claim 1, further comprising:
    determining information associated with a field of view of the robotic device; and
    providing the low-resolution representation of information when the object is not in the field of view of the robotic device.

13. The method of claim 1, wherein the occurrence of the update to the data is associated with a time when the information was stored in a database.

14. The method of claim 13, wherein the data associated with the object comprises information gathered by a second robotic device and stored in the database.

15. A non-transitory computer-readable medium having stored therein executable instructions, that when executed by a computing device, cause the computing device to perform functions comprising:
- determining a high-resolution representation of information associated with an area in which a robotic device is configured to operate, wherein the high-resolution representation of information comprises data associated with an object in the area and an indication of an occurrence of an update to the data associated with the object in the area;
- determining an age of the data associated with the object in the area, wherein the age is associated with an elapsed time from the occurrence of the update to a current time
- determining that the age is greater than an age threshold; and
- in response to determining that the age is greater than the age threshold:
  - determining a low-resolution representation of information associated with the area; and
  - providing the low-resolution representation of information to the robotic device, wherein a size of the low-resolution representation of information is inversely proportional to the age, such that as the age increases, the size of the low-resolution representation of information decreases.

16. The non-transitory computer-readable medium of claim 15, further comprising instructions executable by the computing device to perform functions comprising:
- determining a proximity of the robotic device to the object in the area
- receiving information associated with a change in position of the robotic device; and
- as the proximity increases above a proximity threshold, providing the high-resolution representation of information to the robotic device.

17. The non-transitory computer-readable medium of claim 16, wherein the size of the low-resolution representation of information is proportional to the proximity, such that as the proximity decreases, the size of the low-resolution representation of information decreases.

18. A system comprising:
- a processor; and
- memory including instructions stored therein executable by the processor to perform functions comprising:
  - determining a high-resolution representation of information associated with an area in which a robotic device is configured to operate, wherein the high-resolution representation of information comprises data associated with an object in the area and an indication of an occurrence of an update to the data associated with the object in the area;
  - determining an age of the data associated with the object in the area, wherein the age is associated with an elapsed time from the occurrence of the update to a current time
  - determining that the age is greater than an age threshold; and
  - in response to determining that the age is greater than the age threshold:
    - determining a low-resolution representation of information associated with the area; and
    - providing the low-resolution representation of information to the robotic device, wherein a size of the low-resolution representation of information is inversely proportional to the age, such that as the age increases, the size of the low-resolution representation of information decreases.

19. The system of claim 18, further comprising instructions executable by the processor to perform functions comprising:
- determining a proximity of the robotic device to the object in the area;
- receiving information associated with a change in position of the robotic device; and
- as the proximity increases above a proximity threshold, providing the high-resolution representation of information to the robotic device.

20. The system of claim 19, wherein the size of the low-resolution representation of information is proportional to the proximity, such that as the proximity decreases, the size of the low-resolution representation of information decreases.

* * * * *